J. C. MILES.
HEATING AND VENTILATING APPARATUS.
APPLICATION FILED NOV. 3, 1919.
1,343,330. Patented June 15, 1920.
4 SHEETS—SHEET 1.
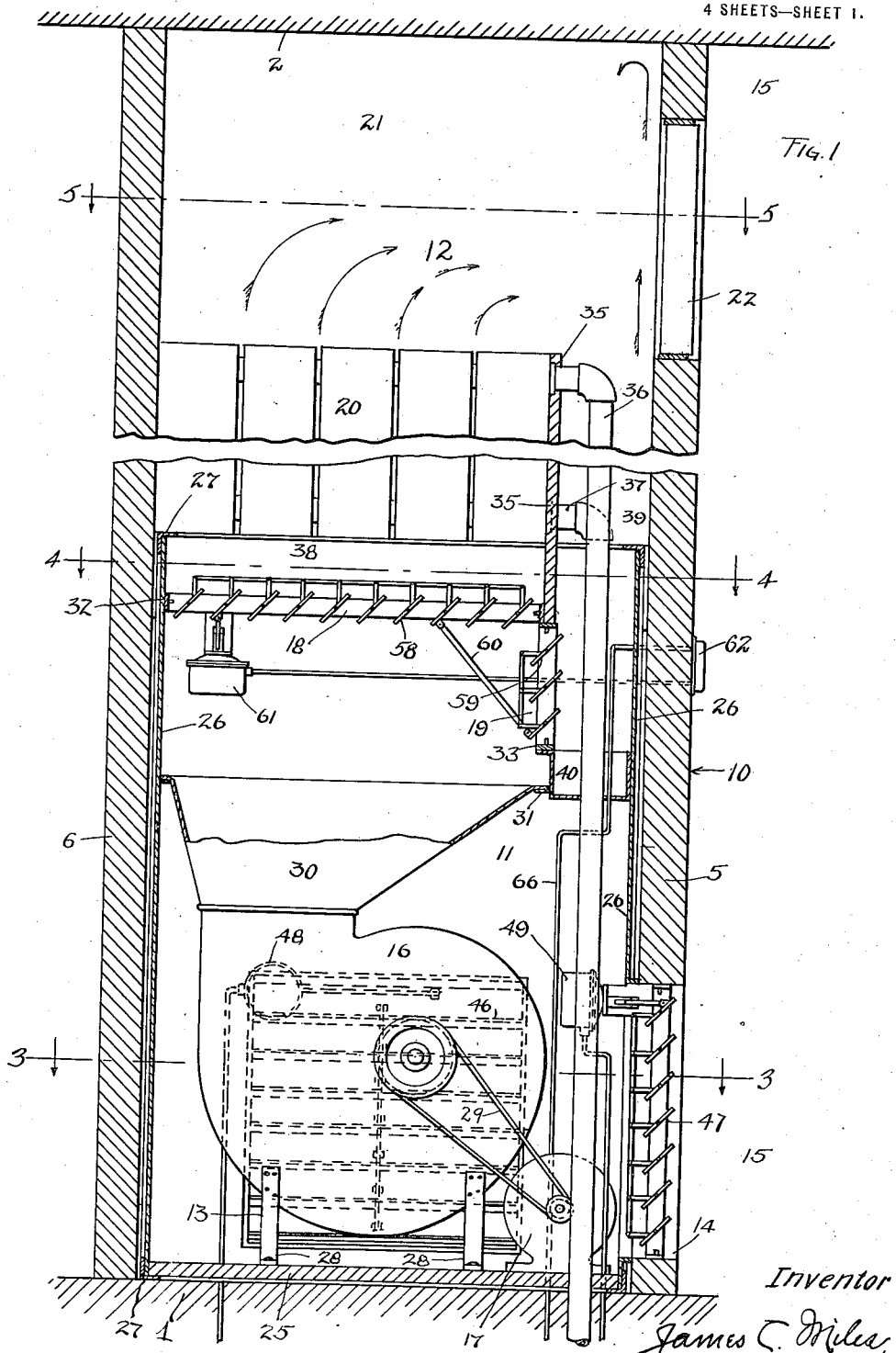
Inventor
James C. Miles,
By Bates & Macklin,
Attys.

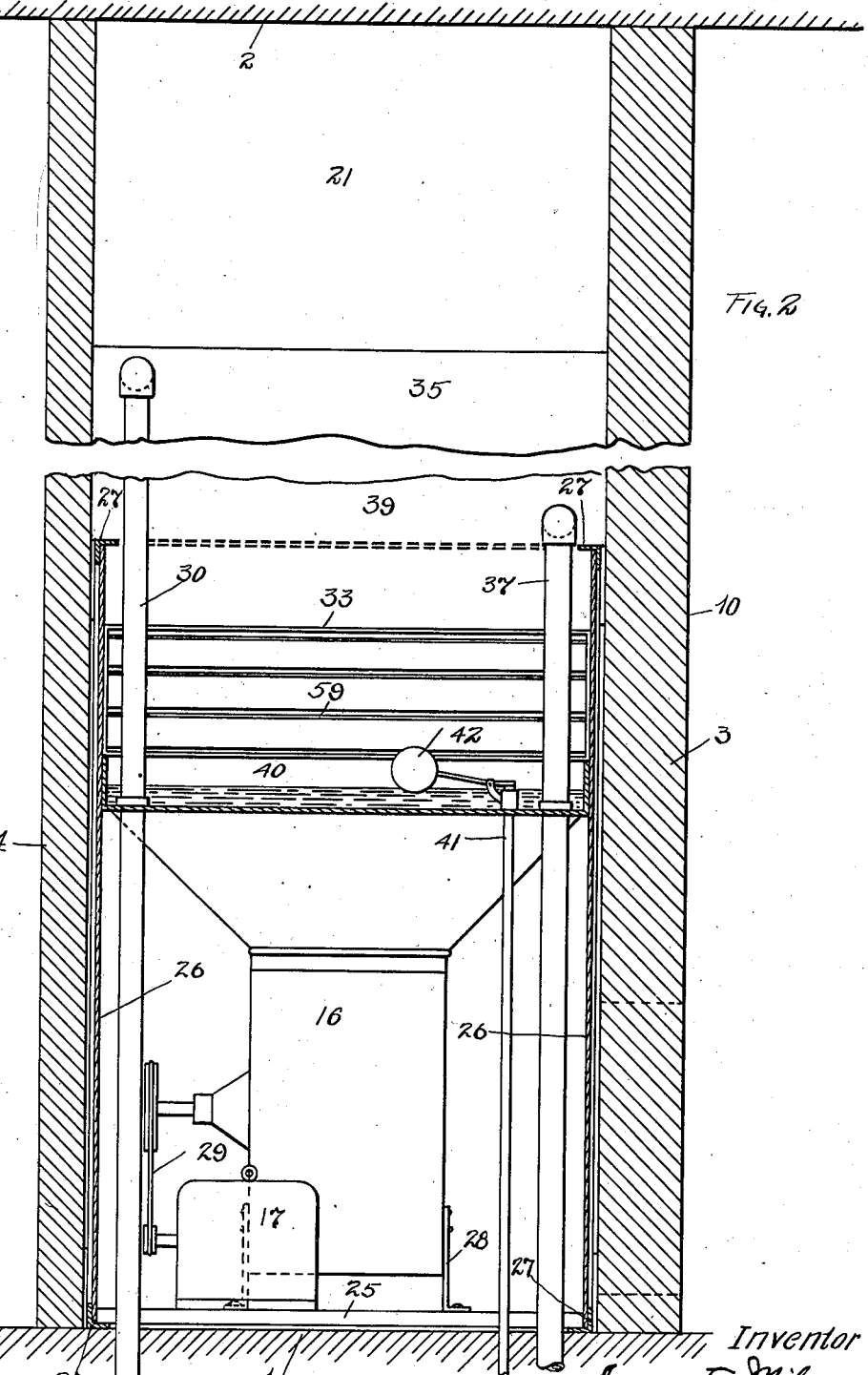

J. C. MILES.
HEATING AND VENTILATING APPARATUS.
APPLICATION FILED NOV. 3, 1919.
1,343,330.
Patented June 15, 1920.
4 SHEETS—SHEET 3.
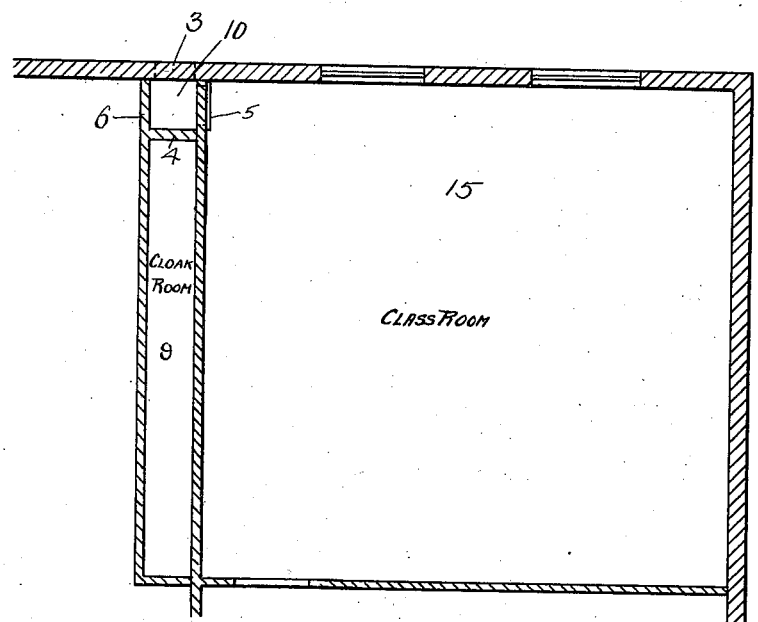
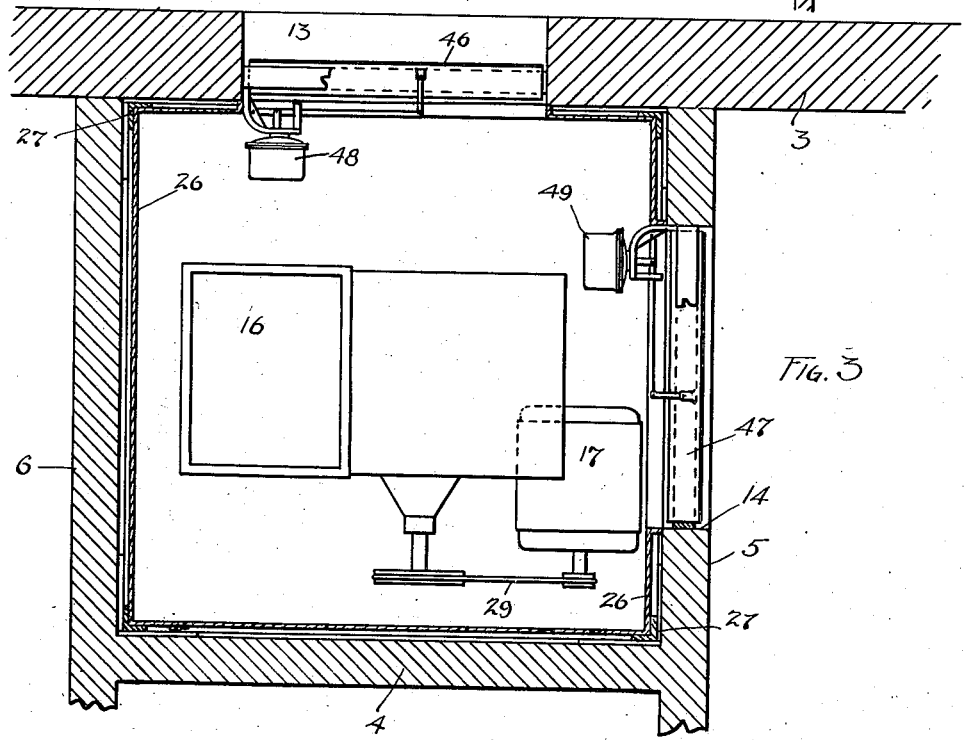
Inventor
James C. Miles,
By Baker & Macklin,
Attys.

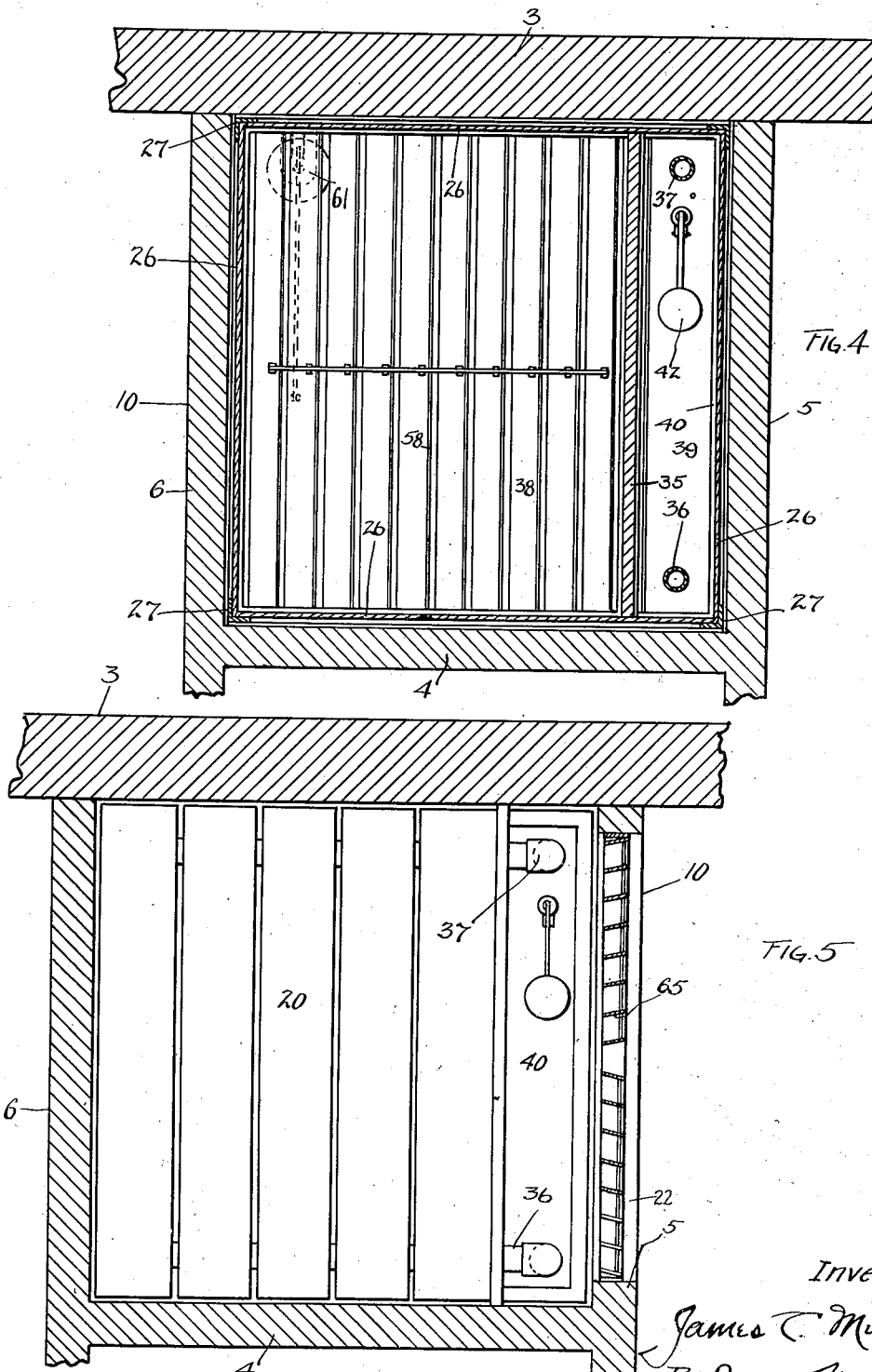

UNITED STATES PATENT OFFICE.

JAMES C. MILES, OF CLEVELAND, OHIO.

HEATING AND VENTILATING APPARATUS.

1,343,330.   Specification of Letters Patent.   Patented June 15, 1920.

Application filed November 3, 1919. Serial No. 335,241.

*To all whom it may concern:*

Be it known that I, JAMES C. MILES, residing at Cleveland, in the county of Cuyahoga and State of Ohio, have invented a certain new and useful Improvement in Heating and Ventilating Apparatus, of which the following is a full, clear, and exact description, reference being had to the accompanying drawings.

This invention relates to a combined heating and ventilating apparatus, which may constantly renew the air in a room, and may be automatically regulated to maintain an even temperature. The apparatus is preferably arranged in a chamber having communication with the room to be heated and with the outside air, such apparatus comprising a suitably driven fan or blower, heating radiators, automatically controlled passageways through and around the radiators, a mixing chamber above the radiators, and convenient humidifying means.

An object of the invention is to so arrange the heating means in relation to the air passageways that an efficient and economical circulation of air may be obtained. Another object is the provision of means whereby air may be drawn at will from the interior of the room to be heated, or from an outside source. A further object is the arrangement of efficient humidifying means in connection with the other parts of the apparatus.

Other objects of the invention will become apparent as the description proceeds. An embodiment of the invention is illustrated in the accompanying drawings, and the essential features are summarized in the claims.

In the drawings, Figure 1 is a vertical section through a chamber containing my heating and ventilating means, showing parts in elevation; Fig. 2 is a similar view at right angles to Fig. 1; Fig. 3 is a horizontal section on the line 3—3 of Fig. 1, parts being shown in plan; Figs. 4 and 5 are horizontal sections on the lines 4—4 and 5—5 respectively of Fig. 1; and Fig. 6 is a horizontal section on a greatly reduced scale illustrating one arrangement of my apparatus with relation to the walls of a room.

Referring to the drawings, I have shown in Fig. 6 a substantially rectangular chamber 10 located in a corner adjacent to an outside wall 3 of a school building and to a wall of a class room 15, preferably arranged at one end of the cloak room 9.

In Figs. 1 to 5 the chamber 10 is shown as having a floor 1, ceiling 2, and side walls 3, 4, 5 and 6, and being divided into two compartments 11 and 12. The lower compartment 11 has in its lower portion openings 13 and 14 communicating respectively with the outside air and with the room 15, the heating and ventilating of which is to be effected. Adjacent to these openings and adapted to blow air from either one, is an air pump or fan 16 driven by a motor 17. From the blower 16 the air passes upwardly and out of the compartment 11 through openings 18 or 19.

In the upper compartment above the opening 18 are one or more radiators 20, and the space 21 above the radiators constitutes a mixing chamber for air passing upwardly through the openings 18 and 19, through and around the radiators. From the mixing chamber the air passes through an opening 22 into the upper portion of the room 15.

The compartment 11 may have a lining comprising a bottom wall 25 and sheet metal side walls 26 secured and reinforced at the corners by angle irons 27. The motor 17 and fan casing 16 are supported by the floor or bottom wall 25, the latter being preferably mounted on legs 28 spacing it from the floor 25. A suitable belt 29 passing over pulleys on the motor and fan shafts may transmit power from the motor to the fan.

The top of the fan housing 16 has secured thereto a funnel-shaped passageway 30 of canvas or other suitable material having its upper end attached to the sides of the compartment 11 as by a peripheral frame 31.

Extending transversely across the chamber 10 and extending vertically into both compartments 11 and 12, parallel and relatively close to the wall 5, is a vertical partition 35 of asbestos or other heat-resisting material, dividing the chamber 10 into vertical passageways 38 and 39. At the lower end of this partition and above the frame 31 is a horizontal frame 32, and a vertical frame 33, around the horizontal and vertical openings 18 and 19.

Above the opening 18 and mounted between the walls 3, 4, 6 and the asbestos wall 35, are the steam or hot water radiators 20, suitably connected by pipes 36 and 37 with a source of supply, not shown.

Secured to the wall 5 and to the frames 31 and 33 is an open pan or trough 40 adapted to receive water through an inlet pipe 41, the level being maintained constant by a float valve 42. Evaporation from this sheet of water constantly maintained provides the requisite humidity for the air blown over it.

The openings 13 and 14 shown near the bottom of the compartment 11 in the outside wall 3 and the wall 5 between the chamber 10 and room 15 are provided with louver dampers 46 and 47 actuated pneumatically through valves 48 and 49, alternately, in conjunction with each other, from a remote point by manual means, not shown. The openings 18 and 19 leading through and around the radiators 20 are provided with louver dampers 58 and 59 connected by a link 60 and actuated through the pneumatic valve 61 controlled automatically from a thermostat 62 within the room 15. The thermostat 62 is also provided with a connection 66, whereby it may be regulated from a distance. The opening 22 near the top of the wall 5 is provided with the fixed vanes or louvers 65, the vanes in one half of the opening 22 being preferably inclined in one direction, and those in the other half inclined in the opposite direction.

When the room is closed for the day, or is to be unoccupied for any considerable length of time, it is desirable to keep the temperature from becoming too low, but the need for a constant supply of fresh air no longer exists. Accordingly the thermostat 62 will be set at the desired temperature, which, if low, may permit the heat supplied to the radiator to be reduced. The inside damper 47 will then be opened and the outside damper 46 closed, and the blower 16 will then cause the warm air already in the room 15 to be circulated. The dampers 58 and 59, being connected together and to the thermostat 62, will automatically selectively control the passage of the air through the openings 18 and 19.

If the air is warm enough the damper 59 will be open and the damper 58 closed, causing the air to pass through the relatively narrow passageway 39 to the opening 22 back into the room 15. If it requires a great deal of heating, the damper 59 will be closed and the damper 58 automatically open thereby permitting the air to pass upward through the opening 18 and between the radiators 20 and thence out through the opening 22. If only a slight heating is required both dampers 58 and 59 will be partly open and a portion of the air will be blown upwardly through each passageway 38 and 39. When the dampers 58 and 59 are both partly open, there will be two currents of air of different temperatures, one ascending through each of the passageways 38 and 39.

The current rising through the passage 39 will have increased velocity due to the restricted area of this passage, and will consequently strike the ceiling 2 acting as a cushion, and be reflected back, thereby causing mixing with the warm air rising more slowly from the passage 38 to take place in that portion of the chamber 21 that is over the passage 39, preventing the relatively heavy cold air settling downwardly through the passage 38, and will thereafter discharge the mixture of warm and cold air into the room 15. The vanes 65 in the opening 22, are arranged to aid in the mixing process.

When the room is to be occupied the damper 47 will be closed and a supply of fresh air will be constantly drawn from outside through the damper 46. This air will be heated by being blown through the passageway 38 and between the radiators 20, or tempered by a portion passing through both passageways 38 and 39 and being mixed above in the mixing chamber 21, or be passed into the room 15 unchanged through the passageway 39, depending upon its temperature and the action of the thermostat 62 in the same manner as above described for the air blown from the room through damper 47.

One of the important features of my invention is the arrangement of the apparatus to provide an improved circulatory system. It will be apparent that the relatively cold air rising through the passageway 39 is not obliged to pass over the radiators before finding its exit 22, but may pass directly out into the room 15, or be mixed in the chamber 21 with the warm air coming upwardly through the passageway 38. In either event it has no opportunity to fall back through the openings between the radiators 20 and thus establish uncontrollable condensation that interferes seriously with the general heat control of the air in the desired manner, as is the case in systems where the cold air must pass above the heating means before finding its outlet into the room.

I claim:

1. The combination of individual unit heating and ventilating apparatus within a chamber adjoining a room, means for drawing air into said chamber, an opening within a wall common to said room and chamber whereby the air may be discharged into the room, means providing two passageways for the air between said first mentioned means and said opening, one being adjacent to and the other remote from said wall and opening, and heating means within said remote passageway.

2. In a chamber having heating and ventilating apparatus, a partition dividing said chamber into two passageways, heating means comprising spaced elements occupying one of said passageways, the other passageway being located between the heating elements and the wall of a room with which the chamber communicates, means within said chamber for blowing air through said passageways into said room, and means between said blowing means and the adjacent ends of the passageways for selectively controlling the entrance of air to such passageways.

3. In a heating and ventilating system, a housing having openings in the lower portion leading both to the interior and the exterior of a room, said housing and room having a common wall, a blower within the housing, means above said blower whereby a current of air drawn through either of said openings may be divided and selectively admitted to two passageways of unequal size through which it may ascend at unequal velocities, heating means within one passageway, and a mixing chamber in the upper portion of said housing whereby air ascending from both passageways may become mixed, and so arranged that the cold air will not drop down through the heating means, and an opening in said wall adjacent to said cold air passageway to permit the passage of air into the room.

4. In a heating and ventilating system, an upright substantially rectangular housing or chamber adjoining a room, a common wall having upper and lower openings therein, a fan in said housing adjacent to said bottom opening for drawing air therethrough into said housing, a partition above said fan parallel to said wall dividing a portion of the housing into two air passageways, heating means within the passageway remote from the wall, and means whereby the air from the other passageway may be mixed with air that has ascended through the heating means and leave the chamber through said upper opening without passing over said heating means.

In testimony whereof I hereunto affix my signature.

JAMES C. MILES.